(12) United States Patent
Wang et al.

(10) Patent No.: US 8,641,240 B2
(45) Date of Patent: Feb. 4, 2014

(54) ELECTRONIC DEVICE HAVING ORGANIC LIGHT EMITTING DIODE DISPLAY

(75) Inventors: Chan-Hee Wang, Yongin (KR);
Dai-Han Cho, Yongin (KR); Hyun-Hee Lee, Yongin (KR); Min-Su Kim, Yongin (KR); Chan-Kyoung Moon, Yongin (KR); Dong-Su Yee, Yongin (KR); Tae-Hyeok Kang, Yongin (KR); Ji-Young Wang, Yongin (KR); Kyu-Hyeong Cheon, Yongin (KR); Kyu-Seob Han, Yongin (KR)

(73) Assignee: Samsung Display Co., Ltd. (KR)

( * ) Notice: Subject to any disclaimer, the term of this patent is extended or adjusted under 35 U.S.C. 154(b) by 218 days.

(21) Appl. No.: 13/337,624

(22) Filed: Dec. 27, 2011

(65) Prior Publication Data

US 2012/0212966 A1    Aug. 23, 2012

(30) Foreign Application Priority Data

Feb. 22, 2011  (KR) .................. 10-2011-0015730

(51) Int. Cl.
*F21V 21/00*     (2006.01)
*F21V 15/01*     (2006.01)

(52) U.S. Cl.
USPC ............... 362/362; 362/249.01; 362/382

(58) Field of Classification Search
USPC ........... 362/632, 633, 634, 546, 217.1, 362, 362/249.01, 249.02, 396, 374, 375, 382, 362/457, 800; 313/504; 257/98, 99; 349/58
See application file for complete search history.

(56) References Cited

U.S. PATENT DOCUMENTS

| 7,278,760 | B2 * | 10/2007 | Heuser et al. ............... 362/293 |
| 8,136,961 | B2 * | 3/2012 | Miller et al. ............... 362/242 |
| 8,328,375 | B2 * | 12/2012 | Diekmann et al. ........... 362/84 |
| 8,436,958 | B2 * | 5/2013 | Lee .............................. 349/60 |
| 8,507,930 | B2 * | 8/2013 | Han et al. .................... 257/98 |
| 2009/0207560 | A1 * | 8/2009 | Lee ........................ 361/679.01 |
| 2011/0122633 | A1 * | 5/2011 | Han et al. .................. 362/382 |
| 2012/0300476 | A1 * | 11/2012 | Hong ......................... 362/374 |

FOREIGN PATENT DOCUMENTS

| KR | 1020040049578 | 6/2004 |
| KR | 1020060026512 | 3/2006 |
| KR | 1020100032696 | 3/2010 |

* cited by examiner

*Primary Examiner* — Bao Q Truong
(74) *Attorney, Agent, or Firm* — Knobbe Martens Olson & Bear LLP

(57) ABSTRACT

An electronic device improves an impact-resistance characteristic of an organic light emitting diode (OLED) display. The electronic device includes an organic light emitting diode (OLED) display including a panel assembly for forming an organic light emitting element, and a housing including a housing main body for receiving the organic light emitting diode (OLED) display. The housing includes a housing main body including a first space for receiving the panel assembly and a second space for receiving a printed circuit board, an upper cover, and a lower cover. The housing main body includes a bottom formed to distinguish a first space and a second space in the housing, and also includes a bent unit on an edge, and a side wall in which the bent unit is buried to be combined with the edge of the bottom.

7 Claims, 3 Drawing Sheets

ELECTRONIC DEVICE HAVING ORGANIC LIGHT EMITTING DIODE DISPLAY

CROSS-REFERENCE TO RELATED APPLICATIONS

This application claims priority to and the benefit of Korean Patent Application No. 10-2011-0015730 filed in the Korean Intellectual Property Office on Feb. 22, 2011, the entire contents of which are incorporated herein by reference.

BACKGROUND

1. Field

The described technology relates generally to an electronic device with a display device. More particularly, the described technology relates to an electronic device having an organic light emitting diode (OLED) display.

2. Description of the Related Technology

An organic light emitting diode (OLED) display includes a plurality of organic light emitting diodes (OLEDs) each of which includes a hole injection electrode, an organic emission layer, and an electron injection electrode. In an OLED, light is emitted by energy that is generated when an exciton that is generated by coupling of electrons and holes falls from an excited state to a ground state within the organic emission layer of the OLED.

Since an OLED display generally has self-luminance characteristics and does not require a separate light source, unlike a liquid crystal display (LCD), thickness and weight thereof can be reduced. Further, because the OLED display has high quality characteristics such as low power consumption, high luminance, and high reaction speed, the OLED display is appropriate for use as a next generation display in mobile electronic devices.

In general, the OLED display includes a panel assembly in which a plurality of OLEDs are formed, and a printed circuit board (PCB) that is electrically connected to the panel assembly through a flexible printed circuit board (FPCB). Also, a metallic bezel may be combined with the panel assembly to supplement the mechanical strength of the panel assembly.

The organic light emitting diode (OLED) display is generally formed with two thin substrates configuring the panel assembly, and it is weak in drop impact when there is an empty space in the panel assembly.

The above information disclosed in this Background section is only for enhancement of understanding of the background of the described technology and therefore it may contain information that does not form the prior art that is already known in this country to a person of ordinary skill in the art.

SUMMARY OF CERTAIN INVENTIVE ASPECTS

The described technology has been made in an effort to provide an electronic device having minimized stress transferred to an organic light emitting diode (OLED) display by minimizing bending and a distorted load in the case of dropping by improving materials and configurations of respective parts of a housing.

One embodiment provides an electronic device including: an organic light emitting diode (OLED) display including a panel assembly for forming an organic light emitting element; and a housing including a housing main body for receiving the organic light emitting diode (OLED) display.

The housing includes a housing main body including a first space for receiving the panel assembly and a second space for receiving a printed circuit, an upper cover, and a lower cover.

The housing main body includes: a bottom formed to distinguish a first space and a second space in the housing, and including a bent unit on an edge; and a side wall in which the bent unit is buried to be combined with the edge of the bottom.

The bottom is formed with a metal material, and the side wall is formed with a reinforced resin including a mixture of glass fibers and synthetic resin.

The bottom is formed with at least one of magnesium, magnesium alloy, stainless steel, and cold-rolled steel.

The bent unit has a hook shape that is convex on one side.

The panel assembly is received in a first space of the housing, and the side wall includes a first side wall unit extended in the first space and a second side wall unit extended in the second space.

The electronic device may further include a bezel for receiving the panel assembly, and the bezel is configured to be received in the first space of the housing.

The electronic device may further include a buffer member provided between the panel assembly and the bezel.

According to an embodiment, the electronic device has a lightened weight and improved mechanical strength by allocating different materials to the bottom of the housing main body and the side wall, and minimizes damage to the panel assembly by reducing impact energy transferred to the panel assembly by providing a bent unit to an edge of the bottom and absorbing bending and a distorting load in the case of dropping.

DETAILED DESCRIPTION OF CERTAIN INVENTIVE EMBODIMENTS

Embodiments of the present invention will be described more fully hereinafter with reference to the accompanying drawings. As those skilled in the art would realize, the described embodiments may be modified in various ways, without departing from the spirit or scope of the present invention.

Figure 1:
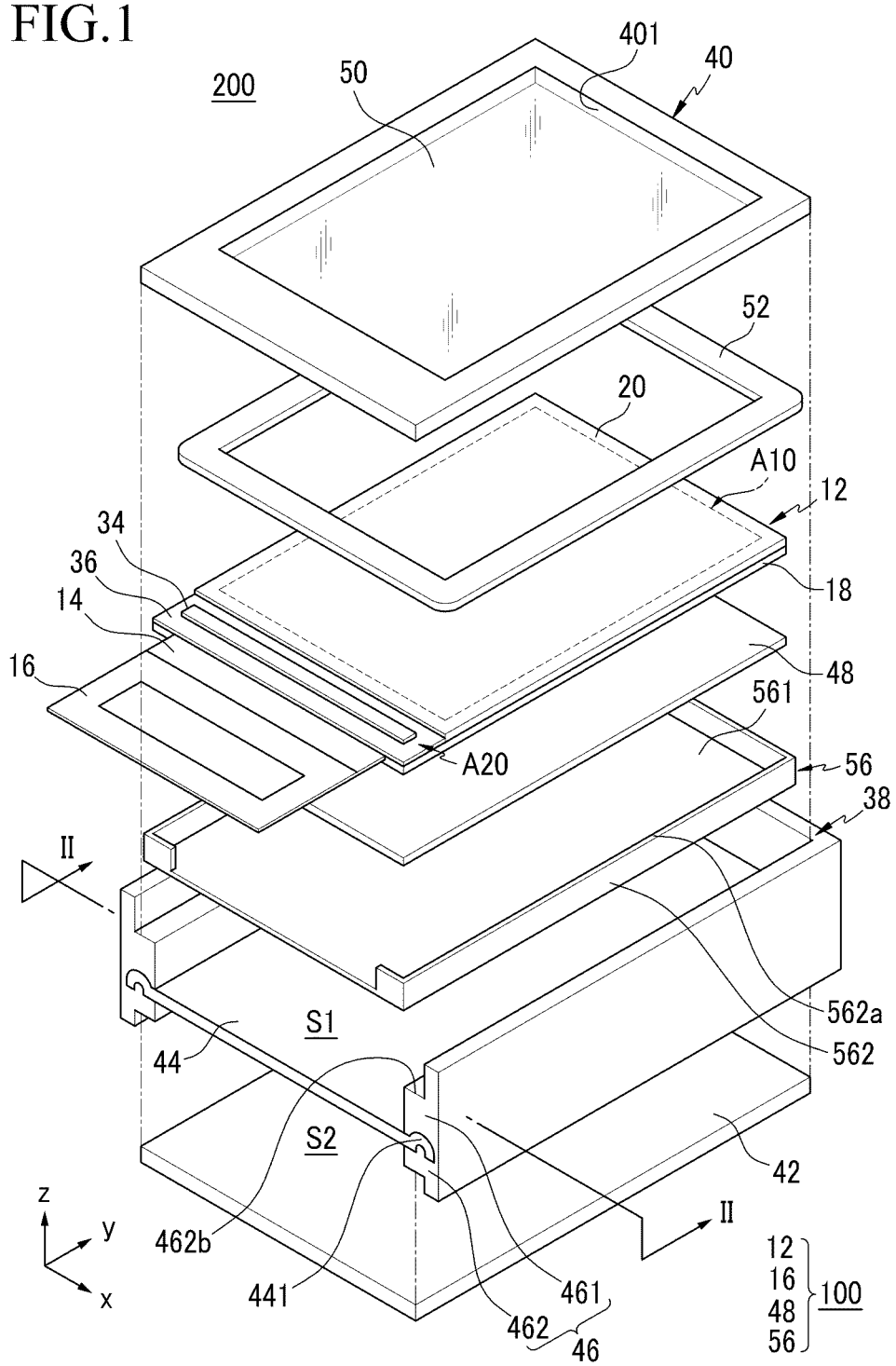
FIG. 1 shows an exploded perspective view of an electronic device having an embodiment of an organic light emitting diode (OLED) display.
Figure 2:
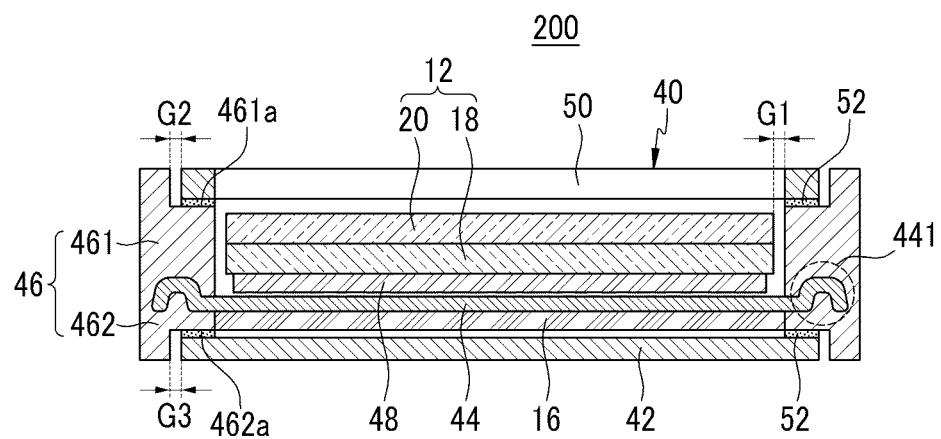
FIG. 2 shows a cross-sectional view of the embodiment of an electronic device shown in FIG. 1, with respect to line II-II, in a combined state.

FIG. 1 shows an exploded perspective view of an embodiment of an electronic device having an organic light emitting diode (OLED) display, and FIG. 2 shows a cross-sectional view of an embodiment of an electronic device shown in FIG. 1, with respect to line II-II, in a combined state.

Referring to FIG. 1 and FIG. 2, an electronic device 200 includes an organic light emitting diode (OLED) display 100 and a housing surrounding the organic light emitting diode (OLED) display 100 and forming a shape of the electronic device 200.

The organic light emitting diode (OLED) display 100 includes a panel assembly 12 having a display area A10 and a pad area A20 and displaying a predetermined image in the display area A10; a bezel 56 for receiving the panel assembly 12; and a printed circuit board (PCB) 16 electrically connected to the panel assembly 12 through a flexible circuit board 14.

The panel assembly 12 includes a first substrate 18 and a second substrate 20, formed to be smaller than the first substrate 18, and having an edge fixed to the first substrate 18 by a sealant. The display area A10 for actually displaying the image is provided in an area in which the first substrate 18 and the second substrate 20 are overlapped inside the sealant, and the pad area A20 is provided on the first substrate 18 outside the sealant.

Sub-pixels are disposed in a matrix format in the display area A10 of the first substrate 18, and a scan driver (not shown) and a data driver (not shown) for driving the sub-pixels are provided between the display area A10 and the sealant, or outside the sealant. Pad electrodes for providing electrical signals to the scan driver and the data driver are provided in the pad area A20 of the first substrate 18.

Figure 3:
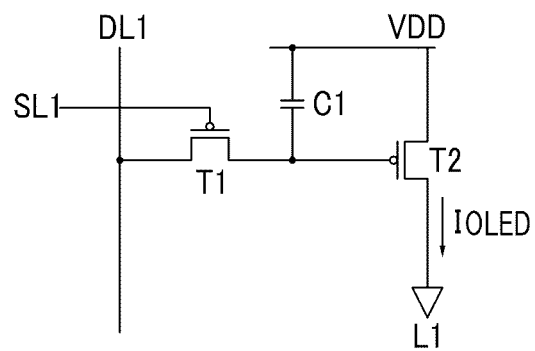
FIG. 3 shows an embodiment of a sub-pixel circuit of a panel assembly configuring an organic light emitting diode (OLED) display.
Figure 4:
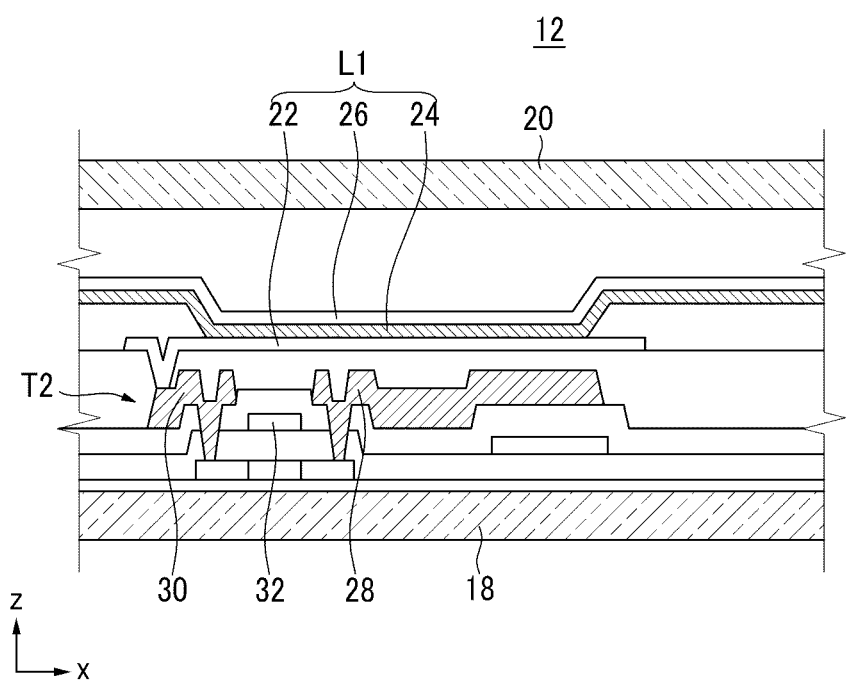
FIG. 4 shows a partially magnified cross-sectional view of an embodiment of a panel assembly configuring an organic light emitting diode (OLED) display.

FIG. 3 shows an embodiment of a sub-pixel circuit of a panel assembly configuring an organic light emitting diode (OLED) display, and FIG. 4 shows an embodiment of a partially magnified cross-sectional view of a panel assembly configuring an organic light emitting diode (OLED) display.

Referring to FIG. 3 and FIG. 4, the sub-pixels of the panel assembly 12 include an organic light emitting element L1 and a driving circuit. The organic light emitting element L1 includes an anode 22, an organic emission layer 24, and a cathode 26, and the driving circuit includes at least two thin film transistors T1 and T2 and at least one storage capacitor C1. The thin film transistor includes a switching transistor T1 and a driving transistor T2.

The switching transistor T1 is connected to the scan line SL1 and the data line DL1, and transmits a data voltage input to the data line DL1 to the driving transistor T2 according to a switching voltage input to the scan line SL1. The storage capacitor C1 is connected to the switching transistor T1 and the power line VDD, and stores a voltage corresponding to a difference between the voltage transmitted by the switching transistor T1 and the voltage supplied to the power line VDD.

The driving transistor T2 is connected to the power line VDD and the storage capacitor C1 to supply an output current ($I_{OLED}$) that is proportional to a square of the difference between the voltage stored in the storage capacitor C1 and the threshold voltage of the organic light emitting element L1. The organic light emitting element L1 emits light by the output current ($I_{OLED}$). The driving transistor T2 includes a source electrode 28, a drain electrode 30, and a gate electrode 32, and an anode 22 of the organic light emitting element L1 can be connected to the drain electrode 30 of the driving transistor T2. A configuration of the sub-pixel is not restricted to the above description and is variable in many ways in other embodiments.

Referring back to FIG. 1 and FIG. 2, the second substrate 20 is bonded with the first substrate 18 by the sealant with a predetermined gap therebetween to seal and protect the driving circuits and the organic light emitting elements formed on the first substrate 18. A polarizing plate (not shown) for controlling reflection of external light is attachable to the outside of the display area A10 the second substrate 20, and an absorbent (not shown) is attachable to the inside of the second substrate 20.

An integrated circuit chip 34 is mounted in the pad area A20 of the panel assembly 12 by a chip on glass (COG) method, and a flexible circuit board 14 is mounted on the same by a chip on film (COF) method. A passivation layer 36 is formed near the integrated circuit chip 34 and the flexible circuit board 14 to cover and protect the pad electrodes formed in the pad area A20.

Electron elements (not shown) for processing a driving signal are mounted in the printed circuit board 16, and a connector (not shown) for transmitting an external signal to the printed circuit board 16 is installed. The flexible circuit board 14 fixed in the pad area A20 is folded toward the lower side of the bottom 44 of the housing main body 38.

The bezel 56 includes a base 561 on which the panel assembly 12 is mounted, and a skirt 562 provided on an edge except a part on which the flexible circuit board 14 is bent from among the edges of the base 561. A buffer member 48 can be provided between the bezel 56 and the panel assembly 12. The buffer member 48 includes a buffer layer having a buffer function, and an adhesive layer provided on an upper side and a lower side of the buffer layer and bonding the panel assembly 12 to the housing main body 38. The buffer layer can include a sponge or urethane. The buffer member 48 reduces impact energy transmitted to the panel assembly 12 from the bezel 56 to suppress damage to the panel assembly 12.

The skirt 562 of the bezel 56 can be provided to be separated from the side of the panel assembly 12 with a predetermined gap therebetween (refer to G1 of FIG. 2). To achieve this, the base 561 of the bezel 56 is formed to be wider than the panel assembly 12. When an external force is applied to the organic light emitting diode (OLED) display 100, the space functions as a buffer to reduce the impact energy transmitted to the panel assembly 12.

A housing for receiving the organic light emitting diode (OLED) display 100 includes a housing main body 38 for providing a first space S1 and a second space S2, an upper cover 40 provided in the first space S1 and combined with the housing main body 38, and a lower cover 42 provided in the second space S2 and combined with the housing main body 38. The organic light emitting diode (OLED) display 100 is provided in the first space S1 of the housing main body 38.

The housing main body 38 includes a bottom 44 on which the organic light emitting diode (OLED) display 100 is provided, and a side wall 46 provided on an edge except the edge on which the flexible circuit board 14 is folded from among the edges of the bottom 44. The side wall 46 includes a first side wall 461 extended to the organic light emitting diode (OLED) display 100 from the bottom 44 to form a first space S1 together with the bottom 44, and a second side wall 462 extended in the opposite direction of the first side wall 461 from the bottom 44 to form a second space S2 together with the bottom 44.

The bottom 44 is made of a metal material with great solidity, such as magnesium, a magnesium alloy, stainless steel, or cold-rolled steel. Further, the bottom 44 has a bent unit 441 on the edge combined with the side wall 46.

The side wall 46 is made of reinforced resin having glass fibers. The glass fiber can be made with various contents depending on the characteristic of solidity, such as for example, of reinforced resin with the glass fiber of between about 10 to about 40 wt %. A resin such as, for example, polycarbonate (PC), acrylonitrile butadiene styrene (ABS), or polycarbonate acrylonitrile butadiene styrene (PCABS) can be used for the synthetic resin.

The housing main body 38 is formed by insertion-injecting the bent unit 441 of the bottom 44 and the side wall 46 to form an integrated body in which the bent unit 441 is buried in the side wall 46. Regarding the integrally formed housing main body 38, a pair of side walls 46 are combined with both edges of the bottom 44 vertically with respect to the bottom 44 so the cross-section of the organic light emitting diode (OLED) display 100 in the width direction (x axis direction in the drawing) is formed to have an "H" shape. The first side wall unit 461 can be formed to be longer than the second side wall unit 462.

The housing main body 38 is formed with the metal and the reinforced resin as described, so it is possible for the housing main body 38 to maintain great solidity against a bending load and a distorting load caused by dropping while maintaining a lighter weight. Also, since the bent unit 441 is installed on the edge of the bottom 44 buried in the side wall 46, an impact applied when dropping is absorbed to minimize bending and distortion of the electronic device 200, and the stress transmitted to the panel assembly 12 is minimized.

The bezel 56, to which the panel assembly 12 is bonded, is bonded with the bottom 44 of the housing main body 38 by a double-sided adhesive tape (not shown).

The side wall 46 includes a first step 461a on an end of the first side wall unit 461 and a second step 462a on an end of the second side wall unit 462. An upper part 562a of the skirt 562 of the bezel 56 is formed on the same surface as the first step 461a. An upper cover 40 is combined with the upper part 562a and the first step 461a, and a lower cover 42 is combined with the second step 462a to be fixed to the housing main body 38. The upper cover 40 and the first step 461a, and the lower cover 42 and the second step 462a are respectively adhered by a buffer tape 52. The buffer tape 52 includes a buffer layer having a buffer function, and an adhesive layer provided on an upper side and a lower side of the buffer layer.

The upper cover 40 and the first side wall unit 461, and the lower cover 42 and the second side wall unit 462, are respectively provided with a predetermined distance therebetween (G2, G3, refer to FIG. 2). According to the above-noted configuration, when an external force is applied to the side wall 46, the space among the side wall 46, the upper cover 40, and the lower cover 42 works as a buffer so that the impact energy applied to the side wall 46 may not be directly transmitted to the upper cover 40 and the lower cover 42.

The upper cover 40 forms an opening 401 corresponding to the display area A10, and a transparent protector 50 is inserted into the opening 401 so that a user standing outside the electronic device 200 may watch the display area A10.

The lower cover 42 is formed to have a plate shape with a constant thickness, and is provided to be separated from the bottom 44 of the housing main body 38 by a predetermined distance. The upper cover 40, the transparent protector 50, and the lower cover 42 are made of a synthetic resin material to make the electronic device 200 lighter.

In the above-configured embodiment of electronic device 200, the housing main body 38 includes the bottom 44 made of a metal material and the side wall 46 made of reinforced resin, thereby maintaining solidity and making the device lighter. That is, when an external impact is applied to the electronic device 200 due to dropping, the major member for maintaining solidity of the electronic device 200 against the external impact is the housing main body 38, and the housing main body 38 is formed by using different materials that are the metallic material and the reinforced resin, thereby minimizing the influence caused by the bending load and the distorting load.

Further, the bent unit 441 is installed on the edge of the bottom 44 buried in the side wall 46 by insert injection to minimize bending and distortion of the electronic device 200 by absorbing the impact applied from the outside when dropping, thereby minimizing the stress transmitted to the panel assembly 12.

Accordingly, the electronic device 200 minimizes damage to the panel assembly 12 caused by the externally applied impact such as a drop impact and improves the mechanical reliability.

While this disclosure has been described in connection with certain embodiments, it is to be understood that the invention is not limited to the disclosed embodiments, but, on the contrary, is intended to cover various modifications and equivalent arrangements included within the spirit and scope of the appended claims.

What is claimed is:

1. An electronic device comprising:
   an organic light emitting diode (OLED) display comprising a panel assembly for forming an organic light emitting element; and
   a housing comprising a housing main body for receiving the organic light emitting diode (OLED) display, wherein the housing main body comprises:
      a bottom formed to distinguish a first space and a second space in the housing, and comprising a bent unit on an edge; and
      a side wall in which the bent unit is buried to be combined with the edge of the bottom.

2. The electronic device of claim 1, wherein
   the bottom is formed with a metal material, and the side wall is formed with a reinforced resin comprising a mixture of glass fibers and synthetic resin.

3. The electronic device of claim 2, wherein
   the bottom is formed with at least one of magnesium, a magnesium alloy, stainless steel, and cold-rolled steel.

4. The electronic device of claim 1, wherein
   the bent unit has a hook shape that is convex on one side.

5. The electronic device of claim 1, wherein
   the panel assembly is received in a first space of the housing, and
   the side wall comprises a first side wall unit extended in the first space and a second side wall unit extended in the second space.

6. The electronic device of claim 1, wherein the electronic device further comprises:
   a bezel for receiving the panel assembly, and
   wherein the bezel is configured to be received in the first space of the housing.

7. The electronic device of claim 6, wherein the electronic device further comprises:
   a buffer member provided between the panel assembly and the bezel.

* * * * *